Dec. 27, 1966 T. R. STOCKTON 3,293,945
INFINITELY VARIABLE SPEED TRANSMISSION
Filed Dec. 30, 1963
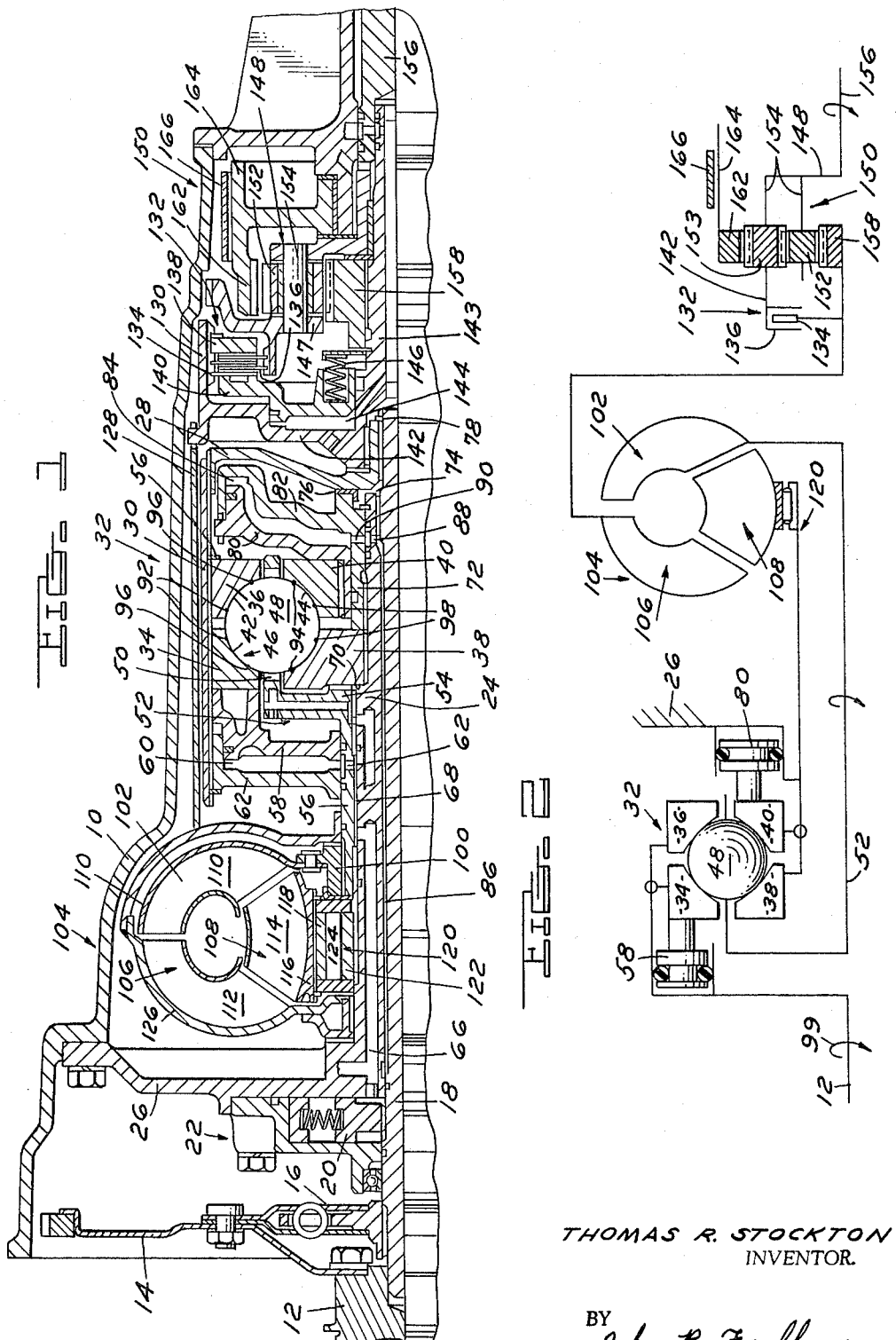
THOMAS R. STOCKTON
INVENTOR.
BY John R. Faulkner
Robert E. McCollum
ATTORNEYS

United States Patent Office 3,293,945
Patented Dec. 27, 1966

3,293,945
INFINITELY VARIABLE SPEED TRANSMISSION
Thomas R. Stockton, Northville, Mich., assignor to Ford Motor Company, Dearborn, Mich., a corporation of Delaware
Filed Dec. 30, 1963, Ser. No. 334,398
6 Claims. (Cl. 74—740)

This invention relates to a transmission for a motor vehicle. More particularly, it relates to one having infinitely variable gear ratio changes, resulting in an extremely smooth drive.

One of the primary objects of the invention is to provide an automatic transmission that is simple in construction, easy to assemble and disassemble, and changes to different drive ratios in an extremely smooth manner.

Another object of the invention is to provide an automatic, infinitely variable speed transmission combining the advantages of a mechanical friction drive, a hydrodynamic drive device, and a forward and reverse gearset.

A further object of the invention is to provide a transmission construction as described above, in which the hydrodynamic device is underdriven with respect to the speed of the power input shaft, and of a size providing minimum slip between its parts when the transmission is operating at road load conditions.

A still further object of the invention is to provide an infinitely variable speed transmission of the type described above, in which the construction and arrangement of the mechanical friction drive device is such as to reduce the rolling element reaction sliding velocities and the rolling element rolling velocities, as well as provide a maximum coefficient of traction at low rolling velocities.

It is also an object of the invention to provide an infinitely variable speed transmission with a mechanical friction drive device constructed and arranged so that the power output flow is in the same direction as that of the input.

Other objects, features, and advantages of the invention will become apparent upon reference to the succeeding detailed description thereof, and to the drawings illustrating the preferred embodiment thereof; wherein, FIGURE 1 is a cross-sectional view of one-half of a transmission embodying the invention; and, FIGURE 2 illustrates the transmission of FIGURE 1 schematically.

FIGURE 1, which is essentially to scale, shows a transmission enclosed by a bell-like housing 10 having its axis aligned with the terminal end of a power input shaft 12. This shaft is driven by any suitable source of power, such as, for example, the internal combustion engine for a motor vehicle. Shaft 12 is bolted to a conventional flywheel 14, which is connected through a known type of vibration damper 16 to one end of a transmission input shaft 18. The rotor 20 of a slipper type fluid pressure pump 22 is splined to shaft 18, and provides a source of fluid under pressure for the transmission control system, not shown. The fluid pressure operates a clutch and a band, and other actuators to be described. Shaft 18 is rotatably mounted within a stationary sleeve shaft 24 extending from a radial partition 26 of housing 10.

At its rearward end, shaft 18 is splinedly connected, by a flange 28, to a cylindrical driving member 30 enclosing a mechanical friction drive device 32. This latter device is of a known infinitely variable speed type having a pair of outer race portions 34 and 36 splined to drive member 30, and a pair of inner race portions 38 and 40. Each of the race portions have complementary concave friction surfaces 42 and 44 defining an annular raceway 46. The raceway contains a number of torque transmitting rolling friction elements, which in this case are balls 48. The balls have substantially a point contact engagement with each of the race portions to provide a frictional drive through the device in a known manner.

Each of the balls 48 is rollingly mounted in the pocket 50 of an annular ball carrier 52, the mounting permitting a radial movement of the ball with respect to the carrier to effect changes in the drive ratios between the input and output of the ball drive. The carrier is connected by a radial extension 54 to one end of a sleeve shaft 56 rotatably mounted upon the stationary shaft 24.

The races and ball elements are axially located and frictionally clamped together, to provide a drive therebetween, in the following manner. Outer race portion 36 is axially located against a snap ring 56. Race portion 34, however, is slidable axially, and forced into a point contact engagement with the ball element 48 by an annular fluid pressure actuated piston 58. The piston is slidably and sealingly mounted in a recess defined by the shaft 56, drive member 30, and a radial extension 62 of the drive member. The piston is moved axially by the admission of fluid under pressure to chamber 60 defined between the piston and extension. The chamber receives fluid through a bore 64 in shaft 56, the bore being connected to the outlet of pump 20 through control valving, not shown, and passage 66 in shaft 24, and the space 68 between this shaft and shaft 56. The admission of fluid under pressure to chamber 60 clamps the race portion 34 against the ball element 48 to frictionally engage it with the race 36 and races 38 and 40.

Inner race portion 38 is splined to stationary shaft 24, and is axially located between a shoulder 70 on the shaft and the end of a collar 72 also splined to the shaft. Collar 72 is held against axial movement by a snap ring 74. The driving flange 28 maintains the complete inner race assembly in position by bearing against a thrust washer 76 abutting collar 72, and held thereagainst by a snap ring 78.

Inner race portion 40, like portion 34, is mounted for a sliding axial movement, and is splined internally to the hub of an axially movable annular piston 80. The piston is sealingly and slidably mounted on an extension 82 of collar 72, and is moved upon admission of fluid under pressure to a chamber 84 defined between the two. The actuating fluid is supplied to the chamber from pump 22 through the control valving and passage 66, the space 86 between shafts 24 and 18, and bores 88 and 90 in shaft 24 and carrier 72.

In operation, the piston 58 determines the ball race clamping forces necessary to maintain a drive through the device, while piston 80 determines the position of race portion 40 so as to fix the ball drive at a particular drive ratio. That is, the control system, not shown, automatically and progressively schedules the changes in drive ratio in accordance with vehicle speed and engine torque demand and other parameters. The fluid under pressure in chamber 84 then moves the inner race portion 40 progressively towards or away from portion 38 to radially move ball element 48 and thus progressively change the drive ratio. The piston 58 is simultaneously moved not only to permit race portion 34 to be moved by the ball element 48, but also to provide the clamping pressure forces that are proper for the particular drive ratio established.

Since the inner race portions are stationary at all times, or permanently grounded, the drive unit is connected at all times for a reduction drive. The carrier member 52 is thus underdriven at all times with respect to the speed of the drive member 30, or input shaft 12. The ball reduction drive is varied in infinite amounts from one extreme, providing a maximum reduction drive, to an opposite extreme, substantially approaching a direct drive.

These two positions are represented by the points 92, 94 and 96, 98. That is, when the ball elements 48 are displaced outwardly by the axial movement of inner race portion 40 towards portion 38, the ball elements will have point contacts with outer race portions 34 and 36 at points 92, and with the inner race portions at points 94. This provides a maximum reduction drive. When the inner race portions are separated, the clamping pressure forces provided by piston 58 moves the outer race portions together, displacing the balls 48 radially inwardly in infinite increments to provide point contacts with the outer and inner race portions at points 96 and 98, thus changing the drive to one approaching a direct drive.

With the inner race stationary, and acting as a reaction member, clockwise rotation of the outer race, in the direction of arrow 99, causes balls 48 to roll around the inner race and thereby drive carrier 52 at a reduced speed with respect to that of the outer race, and in the same direction.

Returning now to the remaining construction, the forward end of carrier shaft 56 is splined to the hub 100 of a pump or impeller member 102 constituting one element of a hydraulic torque converter 104. The converter is of a known type also having a turbine 106, and a stator or reaction member 108. Each of the pump, turbine, and stator members is defined by a set of circumferentially spaced blades 110, 112, and 114, secured between inner and outer annular shrouds, as shown. The shrouds together define a toroidal path for the circulation of fluid from the pump to the turbine and back again in a known manner.

Initially, at low turbine speeds, the stator is held stationary, and the input torque of the pump is multiplied. At higher turbine speeds, the stator freewheels, and the converter acts as a fluid coupling merely transmitting the torque of the pump to the turbine and back again without multiplication. To accomplish this, the inner shroud 116 of the stator is fixed to the outer race 118 of a oneway or overrunning brake 120 of a known type. It has an inner race 122 separated from race 118 by a number of spaced sprags or rollers 124. At low turbine speeds, the angle of discharge of fluid from turbine blades 112 is such that the fluid strikes the backs of the stator blades 114 and attempts to rotate them in a direction opposite to that of the pump 102. This causes the sprags or rollers 124 to wedge the brake races together and hold the stator stationary to establish it as a reaction member for torque multiplication through the converter. At higher turbine speeds, the angle of discharge of the fluid from the turbine is more favorable, and strikes the front faces of the stator blades to rotate them in the same direction as the turbine, which is permitted by the overrunning action of the brake 120.

The turbine outer shroud 126 is made in two parts, which enclose the converter. The shroud has a further axial cylindrical extension 128 enclosing the ball drive unit 32. At its rear edge, the extension is secured to the drum-like driving portion 130 of a fluid pressure actuated Direct drive clutch 132. This clutch has a number of driving friction discs 134 splined to portion 130 and interleaved with a similar number of driven friction discs 136. The discs are slidably mounted between a pressure plate 138, splined to portion 130, and an annular piston 140. The piston is slidably and sealingly movable within a recess defined by a radial extension 142 and the hub 143 of the drum portion 130. Piston 140 is moved to engage the clutch discs and the pressure plates upon admission of fluid under pressure from the control system to a space 144 between the piston and extension 142. The clutch is disengaged by a spring 146.

The clutch driven discs 136 are splined to an extension 147 of an annular carrier member 148 constituting one member of a forward and reverse planetary gearset 150. The gearset includes a planet pinion gear 152 meshing with a second planet pinion gear 153 (FIGURE 2), both gears being rotatably mounted on pinion shafts 154 secured in carrier 148. The carrier constitutes an extension of a power output shaft 156. Pinion 152 meshes with a sun gear 158 splined to the hub 143 of extension 142. Pinion gear 154 meshes with a ring gear 162 rotatably supported in the transmission housing. The ring gear has an axial extension 164, the outer surface of which cooperates with a fluid pressure actuated, spring released brake band 166 to establish a Reverse drive upon release of clutch 132.

It will be clear that, due to the ball drive 32 being permanently conditioned for a reduction drive, and the ball carrier 52 being the output member, the ball reaction sliding velocities and ball rolling velocities are reduced in comparison to other arrangements. Also, it is to be noted that a maximum coefficient of traction is obtained at lower rolling velocities.

A further result of the above construction is that due to the reduction drive of the converter by the ball drive carrier, the converter is relatively large to provide the necessary stall torque ratio. The larger size, however, provides minimum slip between the pump and turbine elements at normal road load conditions.

In overall operation, as seen in both of the figures, Neutral is established by reducing the fluid pressure clamping and ratio determining forces acting on the ball races to prevent a drive of the carrier 52 by the outer race portions 34 and 36. Also, the clutch 132 is disengaged. Therefore, no drive is transmitted to the output shaft 156.

For Low speed forward operation, the ball race clamping and rotation determining pistons 58 and 80 are moved to condition the ball drive unit 32 for a maximum underdrive; that is, inner race portion 40 is moved to the right, allowing the ball 48 to be moved radially inwardly by piston 58. As a result, the ball elements now have point contacts with the outer and inner race portions at 92 and 94, respectively. Clutch 132 is engaged to condition the gearset 150 for a direct drive by connecting sun gear 158 and carrier 148 for rotation at the same speeds. Reverse brake 166 is released.

Forward rotation of input shaft 12 in a clockwise direction, indicated by arrow 99, rotates outer race portions 34 and 36 in the same direction. Since the inner race is held stationary, the balls 48 roll around the inner race, driving the carrier 52 in a clockwise direction and at a speed reduced from that of input shaft 12. Pump 102 is driven at the speed of carrier 52 and begins to drive turbine 106 in the same direction, causing stator 108 to attempt to rotate in a reverse direction. This latter rotation is prevented by engagement of one-way brake 120, thereby initially providing torque multiplication through the converter. The clutch 132 being engaged, output shaft 156 is driven at the speed of turbine 106, and at a speed from that of shaft 12 as determined by the reduction through both the ball drive unit 32 and converter 104.

As the speed of the vehicle changes, ratio determining pistons 80 move automatically in response to signals from the fluid pressure control system, not shown, to move inner race portion 40 in infinite increments towards portion 38, thereby moving the ball element 48 radially outwardly in infinite increments. The fluid pressure forces on the clamping pistons 58 are accordingly automatically varied to permit movement of outer race portion 34 as required for the movement of ball elements 48, while at the same time maintaining the proper clamping pressure forces on the unit elements. The adjustment of the ball drive will take place progressively until a minimum reduction drive is effected, at which point the ball elements will have a point contact with the outer and inner races at points 96 and 98. This latter ratio closely approaches a direct or one-to-one ball drive ratio. Accordingly, the carrier 52 and pump 102 will increase in speed up to that closely approaching the speed of input shaft 12.

Simultaneously, in timed relationship to the adjustment of ball drive unit 32, converter 104 will progressively change from a torque multiplying phase to a fluid coupling operating phase. That is, as the turbine increases in speed, a point will be reached where the fluid discharged from its blades strikes the forward portions of the blades of stator 108 and rotates it in a forward or clockwise direction off the one-way brake 120, thus ending the torque multiplying phase of the converter. Accordingly, the output shaft 156 will progressively increase in speed until it closely approaches that of the input shaft 12.

A Reverse drive is obtained by maintaining the loading and ratio determining pistons 58 and 80 operative, conditioning the ball drive unit 72 for a maximum reduction drive, disengaging direct drive clutch 132, and engaging reverse brake 166. This establishes ring gear 164 as a reaction member. The operation will then be similar to that described above for forward speed operation; however, turbine 106 will drive sun gear 158 counterclockwise, and pinion 153 clockwise. With the ring gear stationary, the pinions 152 and 153 are forced to walk around within the ring gear, in a counterclockwise or reverse direction, thus driving carrier 148 and output shaft 156 in a direction opposite to that of the input shaft 12. The reduction in speed of shaft 156 from that of input shaft 12 will be determined by the compounded reductions through the ball drive unit 32, converter 104, and the gear unit 150.

From the foregoing, it will be seen that the invention provides an infinitely variable speed automatic transmission of simple construction, consisting of a number of infinitely variable speed units in series between the power input and output shafts. It will also be seen that the transmission requires substantially only two fluid pressure actuated friction elements, only one of which is needed at any one time to establish the various drive ratios.

While the invention has been illustrated in its preferred embodiment, it will be clear to those skilled in the arts to which the invention pertains that many changes and modifications may be made thereto without departing from the scope of the invention.

I claim:

1. A transmission having rotatable power input and output shafts, and a plurality of infinitely variable speed drive units connecting said shafts providing a plurality of drives therebetween including a rolling element friction drive unit and a hydraulic torque converter, said drive unit having inner and outer races and a rolling element carrier, said converter having pump and turbine and stator members, means connecting one of said races to said input shaft and said carrier to said pump member, means connecting said turbine member to said output shaft, and means for holding the other friction drive race and said stator member stationary to condition said converter to be underdriven by said carrier and to provide a further underdrive of said output shaft by said turbine.

2. A transmission having rotatable power input and output shafts, and a plurality of infinitely variable speed drive units connecting said shafts providing a plurality of drives therebetween including a rolling element friction drive unit and a hydraulic torque converter, said drive unit having inner and outer races and a rolling element carrier, said converter having pump and turbine and stator members, means connecting one of said races to said input shaft and said carrier to said pump member, means connecting said turbine member to said output shaft, and means for holding the other friction drive race and said stator member stationary to condition said converter to be underdriven by said carrier and to provide a further underdrive of said output shaft by said turbine, said latter means including overrunning means connected to said stator preventing rotation of said stator in one direction to establish a torque multiplied underdrive of said output shaft by said turbine and permitting rotation of said stator in the opposite direction to effect rotation of said output shaft to said turbine substantially at the speed of said carrier.

3. A transmission having a forwardly rotatable power input shaft and an output shaft, and a plurality of infinitely variable speed drive units and a planetary gear unit connecting said shafts providing a plurality of drives therebetween including a mechanical unit and a hydrodynamic torque multiplying unit, each of said units having drive and driven and reaction members, means connecting said mechanical unit drive and driven members to said input shaft and said torque multiplying unit drive member respectively, means connecting said hydrodynamic unit and gear unit driven and drive members to each other and said gear unit driven member to output shaft, and a plurality of brake means for holding the said reaction members of all of said units stationary to establish an underdrive of said hydrodynamic unit by said mechanical unit and a further underdrive of said gear unit by said hydrodynamic unit, and a reverse drive of said output shaft by said gear unit.

4. A transmission having a forwardly rotatable power input shaft and an output shaft, and a plurality of infinitely variable speed drive units and a planetary gear unit connecting said shafts providing a plurality of drives therebetween including a mechanical unit and a hydrodynamic torque multiplying unit, each of said units having drive and driven and reaction members, means connecting said mechanical unit drive and drive members to said input shaft and said torque multiplying unit drive member respectively, means connecting said hydrodynamic unit and gear unit driven and drive members to each other and said gear unit driven member to output shaft, and a plurality of brake means for holding the said reaction members of all of said units stationary to establish an underdrive of said hydrodynamic unit by said mechanical unit and a further underdrive of said gear unit by said hydrodynamic unit, and a reverse drive of said output shaft by said gear unit, and clutch means for connecting two of said members of said gear unit to provide a direct forward drive therethrough upon release of the brake means for said gear unit reaction member.

5. A transmission having a forwardly rotatable power input shaft and an output shaft, and means connecting said shafts providing a plurality of drives therebetween, said means comprising a plurality of infinitely variable speed drive units including a mechanical rolling element friction drive unit and a hydraulic torque converter unit and a planetary gearset, said gearset having drive and driven and reaction members, said drive unit having outer and inner races and a rolling element carrier, said torque converter having a pump, a turbine, and a stator means connecting one of said friction drive races to said input shaft and said carrier to said pump, means connecting said turbine to said gearset drive member and said driven member to said output shaft, and a plurality of means for holding the other friction drive race and stator and said reaction member against rotation in one direction to establish an underdrive of said converter by said carrier and a further underdrive of said drive member by said turbine hydrodynamic unit, and a further reverse reduction drive of said output shaft by said gearset driven member.

6. A transmission having a forwardly rotatable power input shaft and an output shaft, and means connecting said shafts providing a plurality of drives therebetween, said means comprising a plurality of infinitely variable speed drive units including a mechanical rolling element friction drive unit and a hydraulic torque converter unit and a planetary gearset, said gearset having drive and driven and reaction members, said drive unit having outer and inner races and a rolling element carrier, said torque converter having a pump, a turbine, and a stator means connecting one of said friction drive races to said input shaft and said carrier to said pump, means connecting said turbine to said gearset drive member and said driven member to said output shaft, and a plurality of means for holding the other friction drive race and stator and said reaction member against rotation in one direction to establish an underdrive of said converter by said carrier and a further underdrive of said drive member by said turbine hydrodynamic unit, and a further reverse reduction drive of said output shaft by said gearset driven member, and clutch means for connecting two of the members of said gearset to provide a first direct drive therethrough from said turbine upon release of the means for holding said reaction member, and a second substantially direct drive from said carrier upon release of the means for holding said stator.

References Cited by the Examiner

UNITED STATES PATENTS

| | | | |
|---|---|---|---|
| 2,874,592 | 2/1959 | Oehrli | 74—796 |
| 2,886,981 | 5/1959 | Forster | 74—730 |
| 3,006,206 | 9/1961 | Kelley et al. | 74—190.5 |
| 3,173,311 | 3/1965 | Seliber | 74—190.5 X |
| 3,203,278 | 8/1965 | General | 74—730 X |
| 3,216,283 | 11/1965 | General | 74—730 |

FOREIGN PATENTS 184,833   6/1955   Austria.

DAVID J. WILLIAMOSKY, *Primary Examiner.*

J. R. BENEFIEL, *Assistant Examiner.*